No. 805,311. PATENTED NOV. 21, 1905.
J. L. MATTHEWS.
FENDER.
APPLICATION FILED AUG. 1, 1905.

Witnesses
Phil. C. Barnes.
J. S. Elmore

Inventor
J. L. Matthews
By Victor J. Evans
Attorney

UNITED STATES PATENT OFFICE.

JOHN L. MATTHEWS, OF HYDEPARK, MASSACHUSETTS.

FENDER.

No. 805,311.        Specification of Letters Patent.        Patented Nov. 21, 1905.

Application filed August 1, 1905. Serial No. 272,222.

*To all whom it may concern:*

Be it known that I, JOHN L. MATTHEWS, a citizen of the United States, residing at 38 Water street, Hydepark, in the county of Norfolk and State of Massachusetts, have invented new and useful Improvements in Fenders, of which the following is a specification.

This invention relates to car-fenders designed especially for use upon street-cars, and has for its objects to produce a comparatively simple inexpensive device of this character which in practice will normally fold to an unobstructing position beneath the front of the car, one which may be readily released when circumstances require and will when released automatically move to its active unfolded position, and one wherein liability of a person being injured through contact with the fender during operation of the latter is wholly obviated.

With these and other objects in view the invention comprises the novel features of construction and combination of parts more fully hereinafter described.

Figure 1:
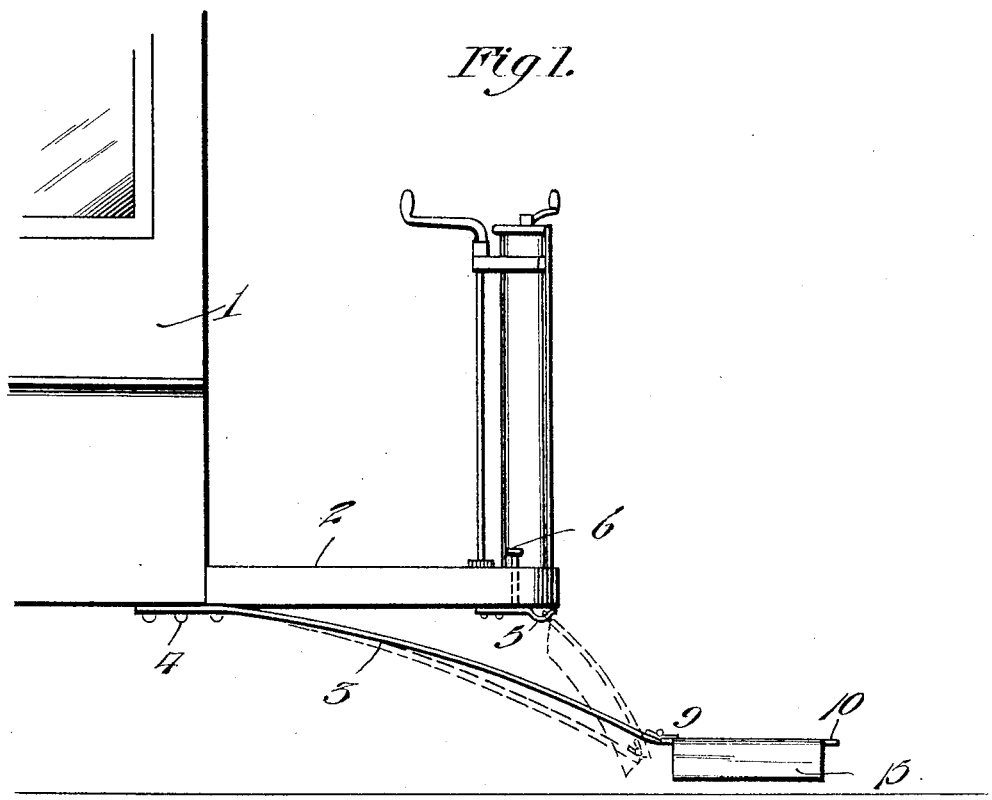
Figure 2:
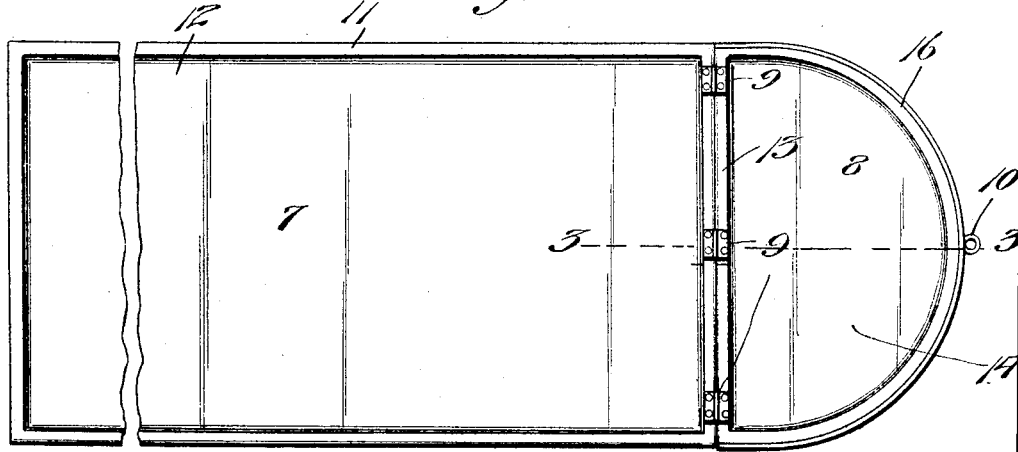
Figure 3:
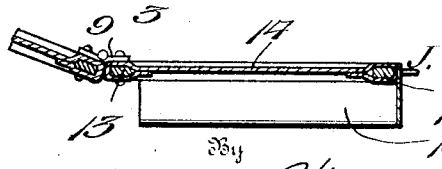

In the accompanying drawings, Figure 1 is a side elevation of a portion of the car, showing my improved fender applied thereto. Fig. 2 is a top plan view of the fender removed from the car. Fig. 3 is a detail sectional view taken on the line 3 3 of Fig. 2.

Referring to the drawings, 1 designates a car of the usual construction having a front platform 2, beneath which the rear end of the fender 3 is bolted or otherwise secured, as at 4, there being attached beneath the front end of the platform 2 a spring-catch 5, designed to be depressed, and thus moved to released position by means of a vertically-reciprocatory foot-lever 6 for a purpose which will hereinafter appear.

The fender 3, constituting the subject-matter of the present invention, is composed wholly of rubber and comprises a rear section 7 and a front movable section 8, pivotally connected by hinges 9 to the section 7 and adapted to fold backward upon the latter, as illustrated by dotted lines in Fig. 1, there being provided at the front end of the section 8 a keeper 10, preferably in the form of an eye, designed to engage with the spring-catch 5 for maintaining the section 8 in folded position. The section 7 consists of a marginal rectangular frame 4, composed of vulcanized rubber, and a covering 12, of sheet-rubber, the edges of which are folded and cemented around the frame 11, while the section 8 likewise comprises a marginal frame 13, having a sheet-rubber covering 14 and a marginal depending curtain or apron 15, which when the fender is in active position hangs in close proximity to the car-track, thus to prevent the passage of bodies beneath the fender, attention being directed to the fact that the fender-section 8 has the front bar 16 of its frame curved, as shown in Fig. 2, and composed of comparatively soft rubber, whereby injury to a person coming in contact with the fender is obviated; further, that the frame 11 of the fender-section 7 possesses a certain amount of springiness or elasticity naturally attendant upon the vulcanized rubber of which the frame is composed.

In practice when the section 8 is secured in its normal folded position, as indicated in Fig. 1, the catch 5 will be engaged with the keeper 10 and the frame 11 of the section 7 sprung to the position indicated by dotted lines in said figure. Under these conditions if it be desirable to throw the fender into action for receiving a person or other object upon the track the attendant depresses the foot-lever 6, thus disengaging the latch 5 from the keeper 10, whereupon the frame 11 in springing to its normal position will automatically throw the section 8 forward to the active position illustrated by full lines in Fig. 1, it being apparent that when in this position the fender will readily pick up a body within its path and that owing to the front bar of the fender being composed of soft rubber a person coming in contact therewith will sustain no injury.

From the foregoing it is apparent that I produce a simple inexpensive device admirably adapted for the attainment of the ends in view, it being understood that minor changes in the details herein set forth may be resorted to without departing from the spirit of the invention.

Having thus described my invention, what I claim as new is—

1. A fender comprising a rear section and a front section pivotally connected therewith, said rear section including a spring-frame, and the front section having a front buffer element composed of soft rubber.

2. The combination with a car, of a fender secured thereto and including a front folded section, a keeper provided on said section, a catch adapted for engagement with said keeper, and a lever for operating the catch to release the keeper.

3. The combination with a car, of a fender secured thereto and comprising a rear spring-frame connected with said frame, a front section and adapted to fold backward thereon, a catch carried by the car, and a keeper provided on the front section for engagement with the catch.

In testimony whereof I affix my signature in presence of two witnesses.

JOHN L. MATTHEWS.

Witnesses:
C. H. McCRILLIS,
KATHRINE A. RILEY.